Dec. 29, 1931.　　　G. E. MOODHE　　　1,838,186
WOOD WORKING MACHINE TOOL
Filed Feb. 17, 1931
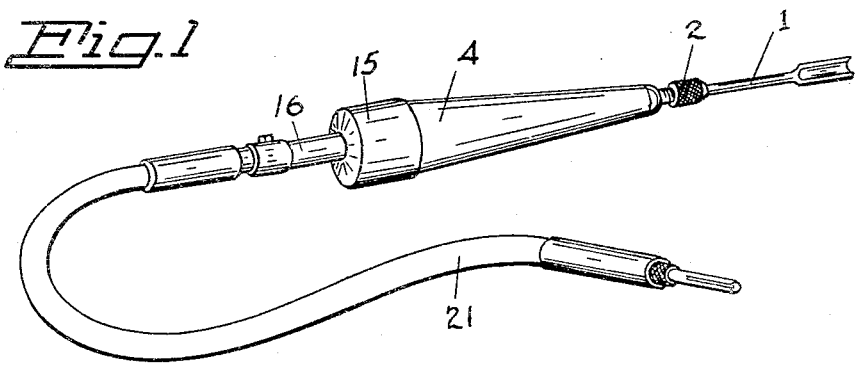
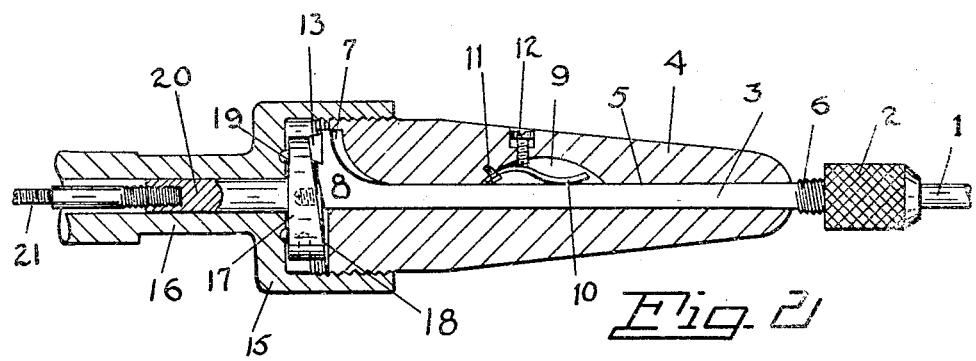
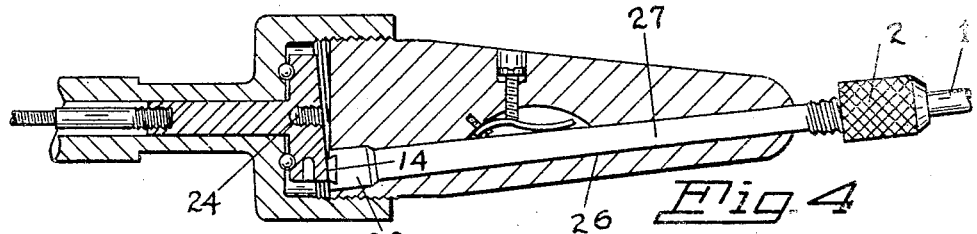
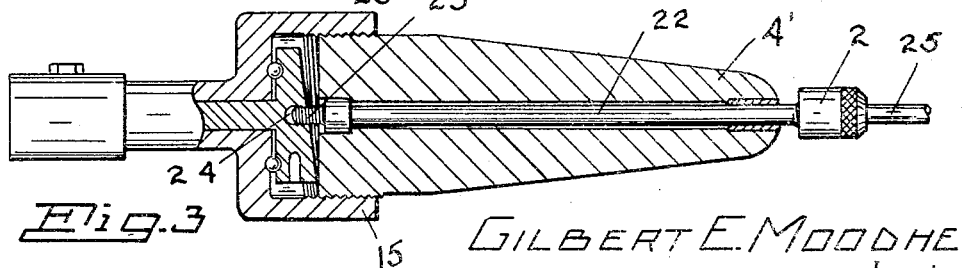
GILBERT E. MOODHE
Inventor
By Herbert E. Smith
Attorney Patented Dec. 29, 1931

1,838,186

UNITED STATES PATENT OFFICE

GILBERT E. MOODHE, OF SPOKANE, WASHINGTON

WOOD WORKING MACHINE TOOL

Application filed February 17, 1931. Serial No. 516,336.

My present invention relates to improvements in wood working machine-tools of the interchangeable type, for use as a reciprocating, impact, carving chisel, or as a rotary drill in counter-sinking, routing, and other similar operations required in the art of wood working or carving.

The primary object of the invention is the provision of a tool of this character which is simple in construction and operation, that is composed of a minimum number of parts, and which is comparatively inexpensive in cost of manufacture and maintenance. The tool is operated by the use of an electric motor, by a motive fluid operated motor, or in other suitable manner, and is controlled by manual pressure as the tool is applied to its work, and the relief of such pressure renders the tool inoperative.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

In addition to the interchangeable features illustrated. I have shown a modified form of the invention, indicating changes that may be made without departing from the principles of my invention.

Figure 1 is an exterior view of the machine tool of my invention showing an impact chisel operated thereby, and the flexible drive shaft to furnish the power for the tool.

Figure 2 is a longitudinal, sectional view, showing the tool-holder and tool head, with the driving-head and connections in full.

Figure 3 is a section similar to Figure 2, with a rotary drill substituted for the reciprocating, impact chisel of Figures 1 and 2.

Figure 4 is a sectional view of a modified form of the invention shown in Figure 2.

The tool of my invention is adapted for use with selected edge-tools, as for instance the channel chisel 1 which is actuated with a reciprocating motion for impact with the work, or with a rotary drill 25 as illustrated in Figure 3, which is used for routing, counter-sinking, and other similar operations. These various tools of a set are interchangeable for use with the chuck 2, and the reciprocating tools and rotary tools are interchangeable, also, with the implement, as will hereinafter be pointed out with regard to Figure 3.

In Figure 2 the chisel 1 is connected by the chuck 2 with a reciprocating shank 3 mounted in the tool holder or handle 4 of the implement, and this shank is designed to reciprocate longitudinally of the holder in its central bore 5. The shank which is threaded to the chuck 2 at 6, is non-rotatable, and is fashioned square in cross section, as is also the bore 5 of the holder. At its rear end the holder is provided with a radially extending recess 7 extending outwardly from the central bore 5, and the shank 3 is provided with a complementary offset head 8, the head and the recess having relative dimensions that will permit a short reciprocating movement of the head in the recess with the reciprocating movement of the shank in the bore.

The shank fits loosely in its bore and the offset head fits loosely in the recess provided therefor, but this looseness of parts is compensated for by the employment of a frictional device or brake mounted in the holder, which exerts the tension necessary to form a brake, but which permits the reciprocation of the tool.

At the approximate center of the tapered tool holder is provided a mortise 9 offset from the bore 5, and a spring blade 10 is secured at one end in the mortise, by means of a set screw 11 with its free end in position to bear with frictional contact against the reciprocating shank 3 of the tool. The tension of the spring blade may be adjusted by turning the tension screw 12 that is accessible from the exterior of the holder and bears against the spring blade.

The non-rotary, reciprocable shank is provided in its offset head 8 with a wear block 13 that is mounted in a dovetail slot or groove in the outer face of the head, and this wear block, which resists the frictional engagement of the driving mechanism, may be renewed from time to time as required, thus enhancing the durability of the shank and reducing the cost of repairs or replacements. The wear block is fashioned of relatively hard metal to withstand the friction, and may with facility be driven from its dovetail groove and with equal facility a fresh block may be substituted for the worn one.

At the rear end of the tool holder a hollow head 15 is threaded on the exterior of the holder, a suitable space being provided between the holder and its head for the driving parts of the implement. The head is fashioned with a tubular bearing stem 16 with its bore alined with the bore of the holder. Between the rear end of the holder and a complementary, spaced wall of the hollow head, is located the circular actuating disk 17 that is provided with a front cam face 18 adapted to bear against the wear block 13 of the reciprocable shank 3 of the tool. At the back of the cam-head or actuating head, ball bearings 19 are interposed between the actuating head and the adjoining wall of the hollow tool head, the bearings being designed to take up the thrust imposed on the actuating head by manual pressure when the tool is being operated.

The actuating head 17 is fashioned with a spindle 20 that is rotatable in the bearing stem 16 of the tool head, and a flexible shaft 21 is connected with this spindle. The shaft may be revolved from an electric motor fluid pressure motor, or other suitable source of power, and of course the actuating head 17 is revolved within the hollow tool head.

In using the implement, with the actuating head revolving, the operator "leans" on the implement, that is he pushes the chisel 1 against the work, with the result that the tool holder, its head and the actuating head, are pushed forward relatively to the shank and its radial head, and as the cam disk or actuating head revolves in contact with the wear block of the shank, the combined action of the longitudinal push on the implement and the rotary movement of the cam head causes the longitudinal reciprocating or impact movement of the implement. When the longitudinal pressure is released from the implement, the frictional engagement of the actuating disk or head with the wear block ceases, and consequently the reciprocal movement of the shank stops. The spring blade 10 now holds the shank and chisel stationary, so that if work is resumed, the stationary chisel may with accuracy and convenience be entered against the work, after which the longitudinal pressure on the implement causes resumption of operation of the tool.

During the wood carving, or working, it is frequently necessary to change from the use of the impact tool or chisel 1 to the use of a rotary or routing tool 25, and this change is readily made by dismantling the holder 4 from the tool head 15 and inserting in its place a complementary tool holder 4', as shown in Figure 3. In lieu of the square shank 3 used in holder 4, a round rotary shank 22 is employed. This shank has a screw end 23 that is secured in the threaded socket 24 at the axial center of the actuating rotary head 17. The rotary drill 25 is secured to the rotary shank 22 by the chuck 2, and the implement is now operated as a rotary drill or tool.

As a modified form of the reciprocating impact tool, I may locate the bore 26 of the tool-holder at an angle to the longitudinal axis of the holder, as in Figure 4, and the radial head 8 of the shank and complementary recess 7 of the holder are dispensed with. The shank 27 is provided with a concentric head 28 and the wear block 14 is mounted in this head for co-action with the cam face 18 of the rotary cam disk or rotary actuating head.

The shank 27 is square in cross section and is alined with the chisel 1 to which it is secured by the chuck 2, and the location of the offset rear end of the shank adjacent the periphery or perimeter of the circular actuating disk provides for the cam action that causes reciprocation of the shank 22 and chisel 1.

It will be apparent that the actuating disk or head may be continuously operating, while the chisel 1 is applied to or withdrawn from its work as required, and that the brake or spring blade 10 holds the chisel stationary when it is withdrawn from its work even though the chisel 1 be turned to position at the top of the implement, and in the absence of vibrations to the chisel, the latter may readily be placed in working position when required.

Having thus fully described my invention, what I claim as new and desire to secure by Letters Patent is:

1. The combination in a pressure controlled tool with a holder having a central bore and a hollow fixed head for the holder, of a relatively movable shank in the holder, a spring blade mounted in the holder for frictional engagement with the shank, a radially extended head on the shank and a wear block in said head, said holder having a recess for the radial head, a rotary cam-head in the hollow head having a cam face for engagement with the wear block, and means for rotating the disk.

2. In a power operated pressure controlled implement of the impact type, the combination with a tool holder and its hollow head, of a relatively movable shank in the holder and a bearing head on said shank, a rotary actuating head in the hollow head, co-acting means on the actuating head and bearing head for converting the rotary movement of the actuating head to reciprocating movement of the implement, and a frictional brake device for the shank.

In testimony whereof I affix my signature.

GILBERT E. MOODHE.